United States Patent
Xu et al.

(10) Patent No.: US 9,344,742 B2
(45) Date of Patent: May 17, 2016

(54) TRANSFORM-DOMAIN INTRA PREDICTION

(75) Inventors: Yaowu Xu, Sunnyvale, CA (US); Qunshan Gu, Hayward, CA (US)

(73) Assignee: GOOGLE INC., Mountain View, CA (US)

(*) Notice: Subject to any disclaimer, the term of this patent is extended or adjusted under 35 U.S.C. 154(b) by 778 days.

(21) Appl. No.: 13/572,013

(22) Filed: Aug. 10, 2012

(65) Prior Publication Data

US 2014/0044166 A1 Feb. 13, 2014

(51) Int. Cl.
*H04N 7/12* (2006.01)
*H04N 19/593* (2014.01)
*H04N 19/61* (2014.01)

(52) U.S. Cl.
CPC ............ *H04N 19/593* (2014.11); *H04N 19/61* (2014.11)

(58) Field of Classification Search
CPC ....... H04N 19/593; H04N 19/61; H04N 7/50; H04N 7/26244; H04N 7/26271; H04N 7/26015; H04N 7/26031
USPC ................................... 375/240.12
See application file for complete search history.

(56) References Cited

U.S. PATENT DOCUMENTS

| | | | |
|---|---|---|---|
| 5,150,209 | A | 9/1992 | Baker et al. |
| 5,708,473 | A | 1/1998 | Mead |
| 5,767,987 | A | 6/1998 | Wolff et al. |
| 5,916,449 | A | 6/1999 | Ellwart et al. |
| 5,930,387 | A | 7/1999 | Chan et al. |
| 5,956,467 | A | 9/1999 | Rabbani et al. |
| 6,005,625 | A | 12/1999 | Yokoyama |
| 6,044,166 | A | 3/2000 | Bassman et al. |
| 6,058,211 | A | 5/2000 | Bormans et al. |
| 6,208,765 | B1 | 3/2001 | Bergen |
| 6,285,804 | B1 | 9/2001 | Crinon et al. |
| 6,292,837 | B1 | 9/2001 | Miller et al. |
| 6,314,208 | B1 | 11/2001 | Konstantinides et al. |
| 6,349,154 | B1 | 2/2002 | Kleihorst |
| 6,473,460 | B1 | 10/2002 | Topper |

(Continued)

FOREIGN PATENT DOCUMENTS

| | | |
|---|---|---|
| EP | 1903698 | 3/2008 |
| JP | 2007267414 | 10/2007 |

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Shan Elahi
(74) *Attorney, Agent, or Firm* — Young Basile Hanlon & MacFarlane P.C.

(57) ABSTRACT

A method for encoding a frame having a plurality of blocks in a video stream using transform-domain intra prediction is disclosed. The method includes generating, using a two-dimensional transform, a set of transform coefficients for a current block; generating, using a one-dimensional transform, a set of transform coefficients for previously coded pixel values in the frame; determining, using the set of transform coefficients for the previously coded pixel values, a set of transform coefficients for a prediction block; determining a residual based on the difference between the set of transform coefficients for the current block and the set of coefficients for the prediction block; and encoding the residual.

12 Claims, 8 Drawing Sheets

(56) References Cited

U.S. PATENT DOCUMENTS

| | | | |
|---|---|---|---|
| 6,611,620 B1 | 8/2003 | Kobayashi et al. | |
| 6,628,845 B1 | 9/2003 | Stone et al. | |
| 6,650,704 B1 | 11/2003 | Carlson et al. | |
| 6,654,419 B1 | 11/2003 | Sriram et al. | |
| 6,785,425 B1 | 8/2004 | Feder et al. | |
| 6,798,901 B1 | 9/2004 | Acharya et al. | |
| 6,907,079 B2 | 6/2005 | Gomila et al. | |
| 7,106,910 B2 | 9/2006 | Acharya et al. | |
| 7,116,830 B2 | 10/2006 | Srinivasan | |
| 7,158,681 B2 | 1/2007 | Persiantsev | |
| 7,197,070 B1 | 3/2007 | Zhang et al. | |
| 7,218,674 B2 | 5/2007 | Kuo | |
| 7,263,125 B2 | 8/2007 | Lainema | |
| 7,333,544 B2 | 2/2008 | Kim et al. | |
| 7,466,774 B2 | 12/2008 | Boyce | |
| 7,602,851 B2 | 10/2009 | Lee et al. | |
| 7,602,997 B2 | 10/2009 | Young | |
| 7,689,051 B2 | 3/2010 | Mukerjee | |
| 7,924,918 B2 | 4/2011 | Lelescu et al. | |
| 8,094,722 B2 | 1/2012 | Wang | |
| 8,111,914 B2 | 2/2012 | Lee et al. | |
| 8,135,064 B2 | 3/2012 | Tasaka et al. | |
| 8,320,470 B2 | 11/2012 | Huang et al. | |
| 8,369,402 B2 | 2/2013 | Kobayashi et al. | |
| 8,559,512 B2 | 10/2013 | Paz | |
| 8,885,956 B2 | 11/2014 | Sato | |
| 9,167,268 B1 | 10/2015 | Gu et al. | |
| 9,247,251 B1 | 1/2016 | Bultje | |
| 2002/0017565 A1 | 2/2002 | Ju et al. | |
| 2002/0026639 A1 | 2/2002 | Haneda | |
| 2002/0071485 A1 | 6/2002 | Caglar et al. | |
| 2003/0202705 A1 | 10/2003 | Sun | |
| 2003/0215018 A1 | 11/2003 | MacInnis et al. | |
| 2003/0215135 A1 | 11/2003 | Caron et al. | |
| 2003/0234795 A1 | 12/2003 | Lee | |
| 2004/0001634 A1 | 1/2004 | Mehrotra | |
| 2004/0101045 A1 | 5/2004 | Yu et al. | |
| 2004/0252886 A1 | 12/2004 | Pan et al. | |
| 2005/0068208 A1* | 3/2005 | Liang et al. | 341/65 |
| 2005/0078754 A1* | 4/2005 | Liang et al. | 375/240.18 |
| 2005/0123207 A1* | 6/2005 | Marpe et al. | 382/239 |
| 2005/0180500 A1 | 8/2005 | Chiang et al. | |
| 2006/0056689 A1 | 3/2006 | Wittebrood et al. | |
| 2006/0164543 A1* | 7/2006 | Richardson et al. | 348/390.1 |
| 2006/0203916 A1 | 9/2006 | Chandramouly et al. | |
| 2006/0215751 A1 | 9/2006 | Reichel et al. | |
| 2007/0025441 A1 | 2/2007 | Ugur et al. | |
| 2007/0036354 A1 | 2/2007 | Wee et al. | |
| 2007/0076964 A1* | 4/2007 | Song | 382/238 |
| 2007/0080971 A1 | 4/2007 | Sung | |
| 2007/0121100 A1 | 5/2007 | Divo | |
| 2007/0177673 A1 | 8/2007 | Yang | |
| 2007/0216777 A1 | 9/2007 | Quan et al. | |
| 2007/0217701 A1 | 9/2007 | Liu et al. | |
| 2008/0069440 A1 | 3/2008 | Forutanpour | |
| 2008/0123750 A1* | 5/2008 | Bronstein et al. | 375/240.24 |
| 2008/0170615 A1 | 7/2008 | Sekiguchi et al. | |
| 2008/0212678 A1 | 9/2008 | Booth et al. | |
| 2008/0239354 A1 | 10/2008 | Usui | |
| 2008/0260042 A1 | 10/2008 | Shah et al. | |
| 2008/0294962 A1* | 11/2008 | Goel | 714/755 |
| 2008/0310745 A1 | 12/2008 | Ye et al. | |
| 2009/0041119 A1* | 2/2009 | Thoreau et al. | 375/240.03 |
| 2009/0161763 A1 | 6/2009 | Rossignol et al. | |
| 2009/0190659 A1 | 7/2009 | Lee et al. | |
| 2009/0232401 A1 | 9/2009 | Yamashita et al. | |
| 2009/0257492 A1 | 10/2009 | Andersson et al. | |
| 2010/0021009 A1 | 1/2010 | Yao | |
| 2010/0023979 A1 | 1/2010 | Patel et al. | |
| 2010/0034265 A1 | 2/2010 | Kim et al. | |
| 2010/0034268 A1 | 2/2010 | Kusakabe et al. | |
| 2010/0086028 A1 | 4/2010 | Tanizawa et al. | |
| 2010/0104021 A1 | 4/2010 | Schmit | |
| 2010/0111182 A1 | 5/2010 | Karczewicz et al. | |
| 2010/0118943 A1 | 5/2010 | Shiodera et al. | |
| 2010/0118945 A1 | 5/2010 | Wada et al. | |
| 2010/0195715 A1 | 8/2010 | Liu et al. | |
| 2010/0266008 A1* | 10/2010 | Reznik | 375/240.2 |
| 2010/0312811 A1* | 12/2010 | Reznik | 708/402 |
| 2010/0329341 A1 | 12/2010 | Kam et al. | |
| 2011/0002541 A1 | 1/2011 | Varekamp | |
| 2011/0026591 A1 | 2/2011 | Bauza et al. | |
| 2011/0033125 A1 | 2/2011 | Shiraishi | |
| 2011/0069890 A1 | 3/2011 | Besley | |
| 2011/0158529 A1 | 6/2011 | Malik | |
| 2011/0170595 A1* | 7/2011 | Shi et al. | 375/240.16 |
| 2011/0170596 A1* | 7/2011 | Shi et al. | 375/240.16 |
| 2011/0170597 A1* | 7/2011 | Shi et al. | 375/240.16 |
| 2011/0170608 A1* | 7/2011 | Shi et al. | 375/240.24 |
| 2011/0206135 A1* | 8/2011 | Drugeon et al. | 375/240.24 |
| 2011/0206289 A1* | 8/2011 | Dikbas et al. | 382/238 |
| 2011/0211757 A1 | 9/2011 | Kim et al. | |
| 2011/0216834 A1* | 9/2011 | Zhou | 375/240.24 |
| 2011/0235706 A1 | 9/2011 | Demircin et al. | |
| 2011/0243225 A1 | 10/2011 | Min et al. | |
| 2011/0243229 A1 | 10/2011 | Kim et al. | |
| 2011/0243230 A1 | 10/2011 | Liu | |
| 2011/0249741 A1 | 10/2011 | Zhao et al. | |
| 2011/0255592 A1 | 10/2011 | Sung et al. | |
| 2011/0268359 A1 | 11/2011 | Steinberg et al. | |
| 2011/0293001 A1 | 12/2011 | Lim et al. | |
| 2012/0014439 A1 | 1/2012 | Segall et al. | |
| 2012/0014444 A1 | 1/2012 | Min et al. | |
| 2012/0020408 A1 | 1/2012 | Chen et al. | |
| 2012/0039384 A1* | 2/2012 | Reznik | 375/240.2 |
| 2012/0039388 A1 | 2/2012 | Kim et al. | |
| 2012/0063691 A1* | 3/2012 | Yu et al. | 382/233 |
| 2012/0082220 A1 | 4/2012 | Mazurenko et al. | |
| 2012/0177108 A1* | 7/2012 | Joshi et al. | 375/240.03 |
| 2012/0278433 A1 | 11/2012 | Liu et al. | |
| 2012/0287986 A1 | 11/2012 | Paniconi et al. | |
| 2012/0287998 A1 | 11/2012 | Sato | |
| 2012/0300837 A1* | 11/2012 | Wilkins et al. | 375/240.12 |
| 2012/0307884 A1 | 12/2012 | MacInnis | |
| 2012/0314942 A1 | 12/2012 | Williams et al. | |
| 2012/0320975 A1 | 12/2012 | Kim et al. | |
| 2013/0027230 A1 | 1/2013 | Marpe et al. | |
| 2013/0121415 A1 | 5/2013 | Wahadaniah et al. | |
| 2014/0044166 A1 | 2/2014 | Xu et al. | |
| 2016/0037174 A1 | 2/2016 | Gu et al. | |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced

(56) References Cited

OTHER PUBLICATIONS video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Bankoski et al. "Technical Overview of VP8, An Open Source Video Codec for the Web". Dated Jul. 11, 2011.

Bankoski, J., Koleszar, J., Quillio, L., Salonen, J., Wilkins, P., and Y. Xu, "VP8 Data Format and Decoding Guide", RFC 6386, Nov. 2011.

Mozilla, "Introduction to Video Coding Part 1: Transform Coding", Video Compression Overview, Mar. 2012, 171 pp.

ISR and Written Opinion in related matter PCT/US2013/054370, mailed Apr. 3, 2014.

Su M_T Sun University of Washington et al. "Encoder Optimization for H.264/AVC Fidelity Range Extensions" Jul. 12, 2005.

Park, Jun Sung, et al., "Selective Intra Prediction Mode Decision for H.264/AVC Encoders", World Academy of Science, Engineering and Technology 13, (2006).

Pan et al., "Fast mode decision algorithms for inter/intra prediction in H.264 video coding." Advances in Multimedia information Processing PCM 2007. Springer Berlin Heidelberg, 2007. pp. 158-167.

Kim et al., "Fast H.264 intra-prediction mode selection using joint spatial and transform domain features." Journal of Visual Communication and Image Representation 17.2, 2006, pp. 291-310.

* cited by examiner

| TLC | CT0 | CT1 | CT2 | CT3 |
|---|---|---|---|---|
| CL0 | DC | Kr*CT1 | Kr*CT2 | Kr*CT3 |
| CL1 | Kc*CL1 | 0 | 0 | 0 |
| CL2 | Kc*CL1 | 0 | 0 | 0 |
| CL3 | Kc*CL1 | 0 | 0 | 0 |

FIG. 7

TRANSFORM-DOMAIN INTRA PREDICTION

TECHNICAL FIELD

This disclosure relates to video encoding and decoding.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

SUMMARY

Implementations of systems, methods, and apparatuses for encoding and decoding a video signal using transform-domain intra prediction are disclosed herein.

One aspect of the disclosed implementations is a method for encoding a video including a plurality of frames having a plurality of blocks including a current block. The method includes generating, using a two-dimensional transform, a set of transform coefficients for the current block; generating, using a one-dimensional transform, a set of transform coefficients for a plurality of previously coded pixel values in the frame; determining, using the set of transform coefficients for the previously coded pixel values, a set of transform coefficients for a prediction block; determining a residual based on the difference between the set of transform coefficients for the current block and the set of coefficients for the prediction block; and encoding the residual.

Another aspect of the disclosed implementations is a method for decoding a frame in an encoded video stream, the frame having a plurality of blocks including a current block. The method includes decoding a residual; generating, using a one-dimensional transform, a set of transform coefficients for a plurality of previously decoded pixel values in the frame; generating, using the set of transform coefficients for the previously decoded pixel values, a set of transform coefficients for a prediction block; determining a set of transform coefficients for the current block based on sum of the residual and the set of transform coefficients for the prediction block; and inverse transforming the set of transform coefficients for the current block;

Another aspect of the disclosed implementations is an apparatus for encoding a frame in a video stream having a plurality of blocks including a current block. The apparatus includes a memory and a processor configured to execute instructions stored in the memory to generate, using a two-dimensional transform, a set of transform coefficients for the current block; generate, using a one-dimensional transform, a set of transform coefficients for a plurality of previously coded pixel values in the frame; determine, using the set of transform coefficients for the previously coded pixel values, a set of transform coefficients for a prediction block; determine a residual based on the difference between the set of transform coefficients for the current block and the set of coefficients for the prediction block; and encode the residual.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein:

FIG. 7 is a diagram of an example prediction block using transform-domain intra prediction in accordance with implementations of this disclosure.

DETAILED DESCRIPTION

Digital video is used for various purposes, including, for example, remote business meetings via video conferencing, high definition video entertainment, video advertisements, or sharing of user-generated videos. Video encoding and decoding (codec) can use various compression schemes. These compression schemes may include breaking a video image into blocks and generating a digital video output bitstream using one or more techniques to limit the information included in the output. A received bitstream can be decoded to re-create the blocks and the source images from the limited information.

Encoding a video stream, or a portion thereof, such as a frame or a block, can include using temporal and spatial similarities in the video stream to improve coding efficiency. For example, a current block of a video stream may be encoded based on a previously encoded block in the video stream by predicting motion and color information for the current block based on the previously encoded block and identifying a difference (residual) between the predicted values and the current block.

Intra prediction can include using a previously encoded block from the current frame to predict a block. In some instances, intra prediction, such as spatial-domain intra prediction, may be based on directional features, such as horizontal or vertical features within a block; however, intra prediction based on directional features can be inefficient or imprecise for predicting objects within a block. For example, intra prediction can produce sub-optimal predictions for blocks including pixel values that increase or decrease along directional lines.

Instead of, or in addition to performing spatial-domain intra prediction, intra prediction can be performed in the transform domain, in which the blocks of pixel values may be transformed into transform coefficients and intra prediction may be performed on the transform coefficients. In some implementations, transform-domain intra prediction may produce more accurate prediction results, may incur a lower overhead by, for example, using a reduced set of prediction modes, or may increase accuracy and lower overhead.

In some implementations, transform-domain intra prediction may include transforming a block of pixel values in a video stream into a block of transform coefficients. Pixel values in previously encoded blocks, such as a row in a block immediately above the current block, or a column in a block immediately to the left of the current block, can be transformed into transform coefficients and may be referred to as a set of "transform-domain predictors". The transform-domain predictors can be used to determine a transform-domain prediction block for the current block. A residual can be calculated as the difference of the transform-domain prediction block and the transform coefficient block, and can be encoded in the output bitstream.

Figure 1:
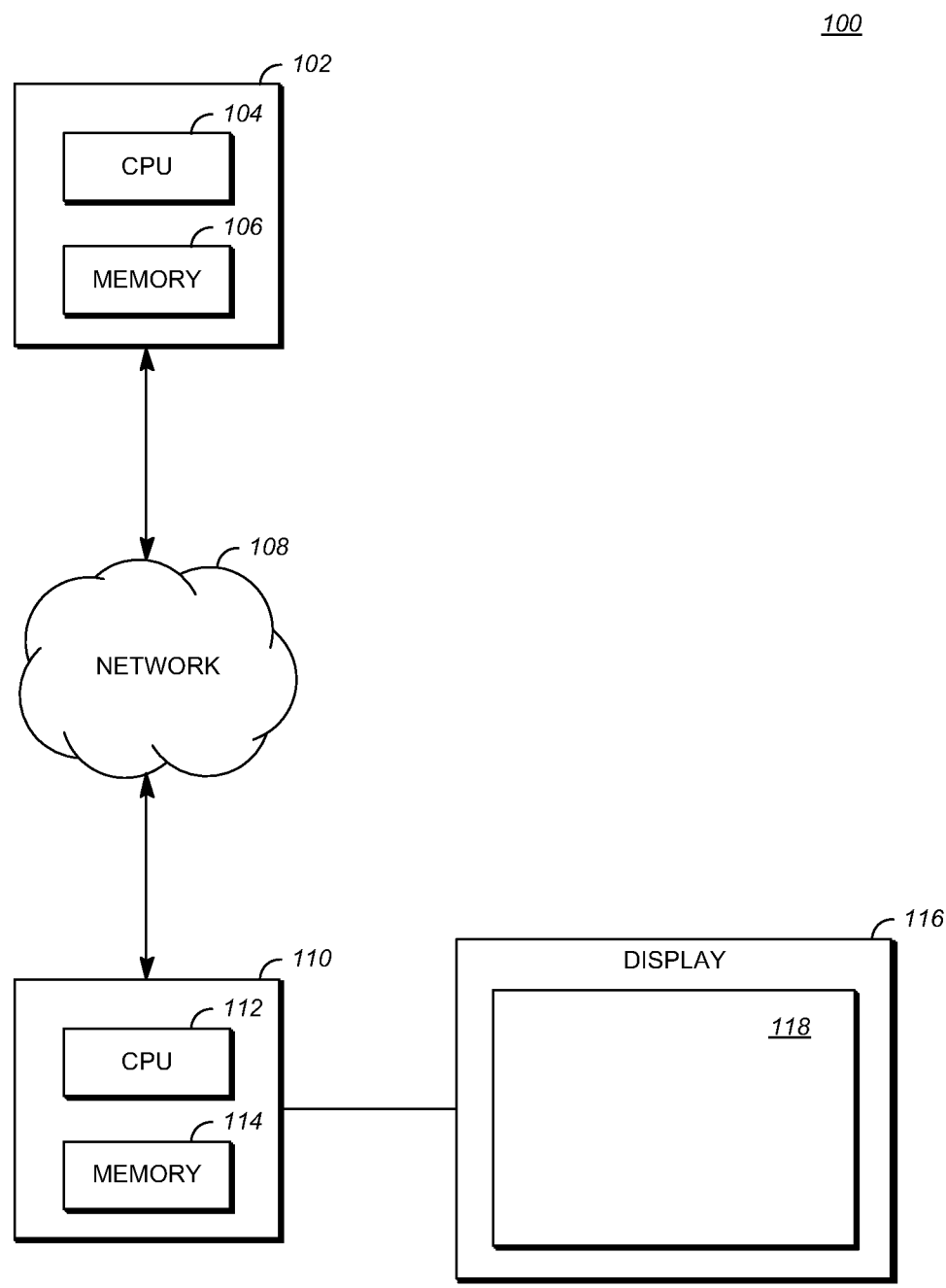
FIG. 1 is a schematic of a video encoding and decoding system in accordance with implementations of this disclosure.

These and other examples are now described with reference to the accompanying drawings. FIG. 1 is a schematic of a video encoding and decoding system 100 in which aspects of the disclosure can be implemented. An exemplary transmitting station 102 can be, for example, a computer having an internal configuration of hardware including a processor such as a central processing unit (CPU) 104 and a memory 106. CPU 104 is a controller for controlling the operations of transmitting station 102. CPU 104 can be connected to the memory 106 by, for example, a memory bus. Memory 106 can be read only memory (ROM), random access memory (RAM) or any other suitable memory device. Memory 106 can store data and program instructions that are used by CPU 104. Other suitable implementations of transmitting station 102 are possible. For example, the processing of transmitting station 102 can be distributed among multiple devices.

A network 108 connects transmitting station 102 and a receiving station 110 for encoding and decoding of the video stream. Specifically, the video stream can be encoded in transmitting station 102 and the encoded video stream can be decoded in receiving station 110. Network 108 can be, for example, the Internet. Network 108 can also be a local area network (LAN), wide area network (WAN), virtual private network (VPN), a cellular telephone network or any other means of transferring the video stream from transmitting station 102 to, in this example, receiving station 110.

Receiving station 110 can, in one example, be a computer having an internal configuration of hardware including a processor such as a CPU 112 and a memory 114. CPU 112 is a controller for controlling the operations of receiving station 110. CPU 112 can be connected to memory 114 by, for example, a memory bus. Memory 114 can be ROM, RAM or any other suitable memory device. Memory 114 can store data and program instructions that are used by CPU 112. Other suitable implementations of receiving station 110 are possible. For example, the processing of receiving station 110 can be distributed among multiple devices.

A display 116 configured to display a video stream can be connected to receiving station 110. Display 116 can be implemented in various ways, including by a liquid crystal display (LCD), a cathode-ray tube (CRT), or a light emitting diode display (LED), such as an OLED display. Display 116 is coupled to CPU 112 and can be configured to display a rendering 118 of the video stream decoded in receiving station 110.

Other implementations of the encoder and decoder system 100 are also possible. For example, one implementation can omit network 108 and/or display 116. In another implementation, a video stream can be encoded and then stored for transmission at a later time by receiving station 110 or any other device having memory. In one implementation, receiving station 110 receives (e.g., via network 108, a computer bus, or some communication pathway) the encoded video stream and stores the video stream for later decoding. In another implementation, additional components can be added to the encoder and decoder system 100. For example, a display or a video camera can be attached to transmitting station 102 to capture the video stream to be encoded.

Figure 2:
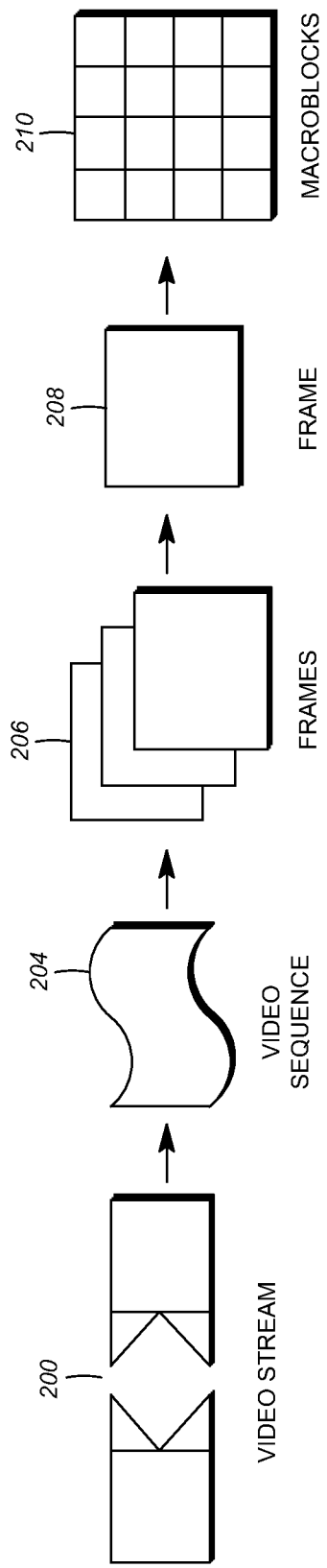
FIG. 2 is a diagram of an example video stream to be encoded and decoded in accordance with implementations of this disclosure.

FIG. 2 is a diagram of a typical video stream 200 to be encoded and decoded. Video stream 200 (also referred to herein as video data) includes a video sequence 204. At the next level, video sequence 204 includes a number of adjacent frames 206. While three frames are depicted in adjacent frames 206, video sequence 204 can include any number of adjacent frames. Adjacent frames 206 can then be further subdivided into individual frames, e.g., a single frame 208. Each frame 208 can capture a scene with one or more objects, such as people, background elements, graphics, text, a blank wall, or any other information.

At the next level, single frame 208 can be divided into a set of blocks 210, which can contain data corresponding to, in some of the examples described below, a 4×4 pixel group in frame 208. Block 210 can also be of any other suitable size such as a block of 16×8 pixels, a block of 8×8 pixels, a block of 16×16 pixels or of any other size. Depending on the application, block 210 can also refer to a subblock, which is a subdivision of a macroblock. Unless otherwise noted, the term 'block' can include a subblock, a macroblock, a segment, a slice, a residual block or any other portion of a frame. A frame, a block, a pixel, or a combination thereof can include display information, such as luminance information, chrominance information, or any other information that can be used to store, modify, communicate, or display the video stream or a portion thereof.

Figure 3:
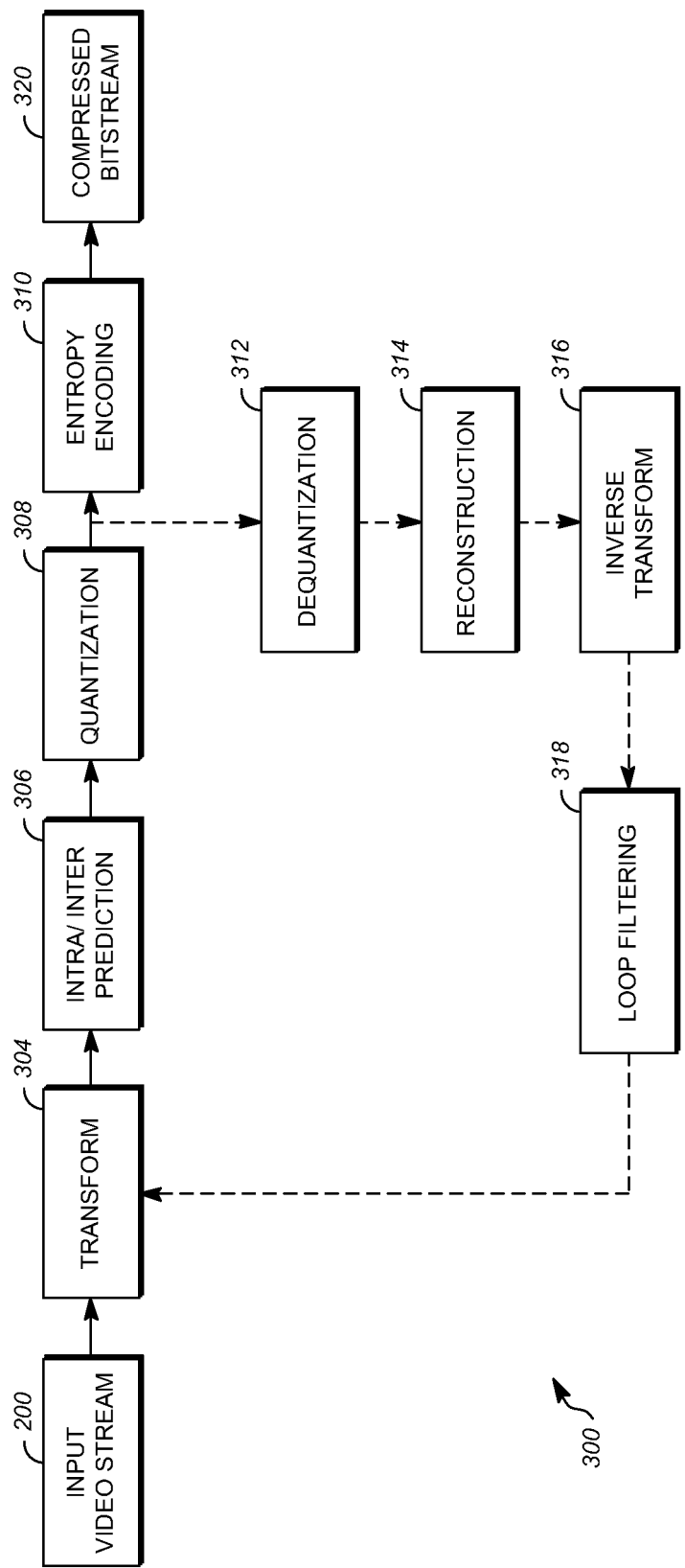
FIG. 3 is a block diagram of a video compression system in accordance with implementations of this disclosure.

FIG. 3 is a block diagram of an encoder 300 in accordance with one implementation. Encoder 300 can be implemented, as described above, in transmitting station 102 such as by providing a computer software program stored in memory 106, for example. The computer software program can include machine instructions that, when executed by CPU 104, cause transmitting station 102 to encode video data in the manner described in FIG. 3. Encoder 300 can also be implemented as specialized hardware in, for example, transmitting station 102. Encoder 300 has the following stages to perform the various functions in a forward path (shown by the solid connection lines) to produce an encoded or a compressed bitstream 320 using input video stream 200: a transform stage 304, an intra/inter prediction stage 306, a quantization stage 308, and an entropy encoding stage 310. Encoder 300 may include a reconstruction path (shown by the dotted connection lines) to reconstruct a frame for encoding of future blocks. In FIG. 3, encoder 300 has the following stages to perform the various functions in the reconstruction path: a dequantization stage 312, an inverse transform stage 314, a reconstruction stage 316, and a loop filtering stage 318. Other structural variations of encoder 300 can be used to encode video stream 200.

When video stream 200 is presented for encoding, each frame 208 within video stream 200 can be processed in units of blocks. Referring to FIG. 3, transform stage 304 transforms a current block into a block of transform coefficients in, for example, the frequency domain. Examples of block-based transforms include the Karhunen-Loève Transform (KLT), the Discrete Cosine Transform (DCT), Walsh-Hadamard Transform (WHT), and the Singular Value Decomposition Transform (SVD). In one example, the DCT transforms the block into the frequency domain. In the case of DCT, the transform coefficient values are based on spatial frequency, with the lowest frequency (e.g., DC) coefficient at the top-left of the matrix and the highest frequency coefficient at the bottom-right of the matrix.

At intra/inter prediction stage 306, each block can be encoded using either intra prediction (i.e., within a single frame) or inter prediction (i.e. from frame to frame). In either case, a prediction block can be formed. The prediction block is then subtracted from the block of transform coefficients to produce a residual block (also referred to herein as residual).

Intra prediction (also referred to herein as intra-prediction or intra-frame prediction) and inter prediction (also referred to herein as inter-prediction or inter-frame prediction) are techniques used in modern image/video compression schemes. In the case of intra-prediction, a prediction block can be formed from samples in the current frame that have been previously encoded and reconstructed. In the case of inter-prediction, a prediction block can be formed from samples in one or more previously constructed reference frames.

The prediction block is then subtracted from the block of transform coefficients; the difference, i.e., the residual is then encoded and transmitted to decoders. Image or video codecs may support many different intra and inter prediction modes; each image block can use one of the prediction modes to provide a prediction block that is most similar to the block of transform coefficients to minimize the information to be encoded in the residual. The prediction mode for each block of transform coefficients can also be encoded and transmitted, so a decoder can use same prediction mode(s) to form prediction blocks in the decoding and reconstruction process.

Quantization stage 308 converts the residual into discrete quantum values, which are referred to as quantized transform coefficients, using a quantizer value or quantization levels. The quantized transform coefficients are then entropy encoded by entropy encoding stage 310. The entropy-encoded coefficients, together with other information used to decode the block, which can include for example the type of prediction used, motion vectors, and quantization value, are then output to compressed bitstream 320. Compressed bitstream 320 can be formatted using various techniques, such as variable length encoding (VLC) and arithmetic coding. Compressed bitstream 320 can also be referred to as an encoded video stream and the terms will be used interchangeably herein.

The reconstruction path in FIG. 3 (shown by the dotted connection lines) can be used to provide both encoder 300 and a decoder 400 (described below) with the same reference frames to decode compressed bitstream 320. The reconstruction path performs functions that are similar to functions that take place during the decoding process that are discussed in more detail below, including dequantizing the quantized transform coefficients at dequantization stage 312 to generate dequantized transform coefficients (i.e., derivative residual). At reconstruction stage 314, the prediction block that was predicted at intra/inter prediction stage 306 can be added to the dequantized transform coefficients (i.e., derivative residual) to create reconstructed transform coefficients. At inverse transform stage 316, the reconstructed transform coefficients can be inverse transformed to produce a reconstructed block. Loop filtering stage 318 can be applied to the reconstructed block to reduce distortion such as blocking artifacts.

Other variations of encoder 300 can be used to encode compressed bitstream 320. For example, a non-transform based encoder 300 can quantize the residual block directly without transform stage 304. In another implementation, an encoder 300 can have quantization stage 308 and dequantization stage 312 combined into a single stage.

Figure 4:
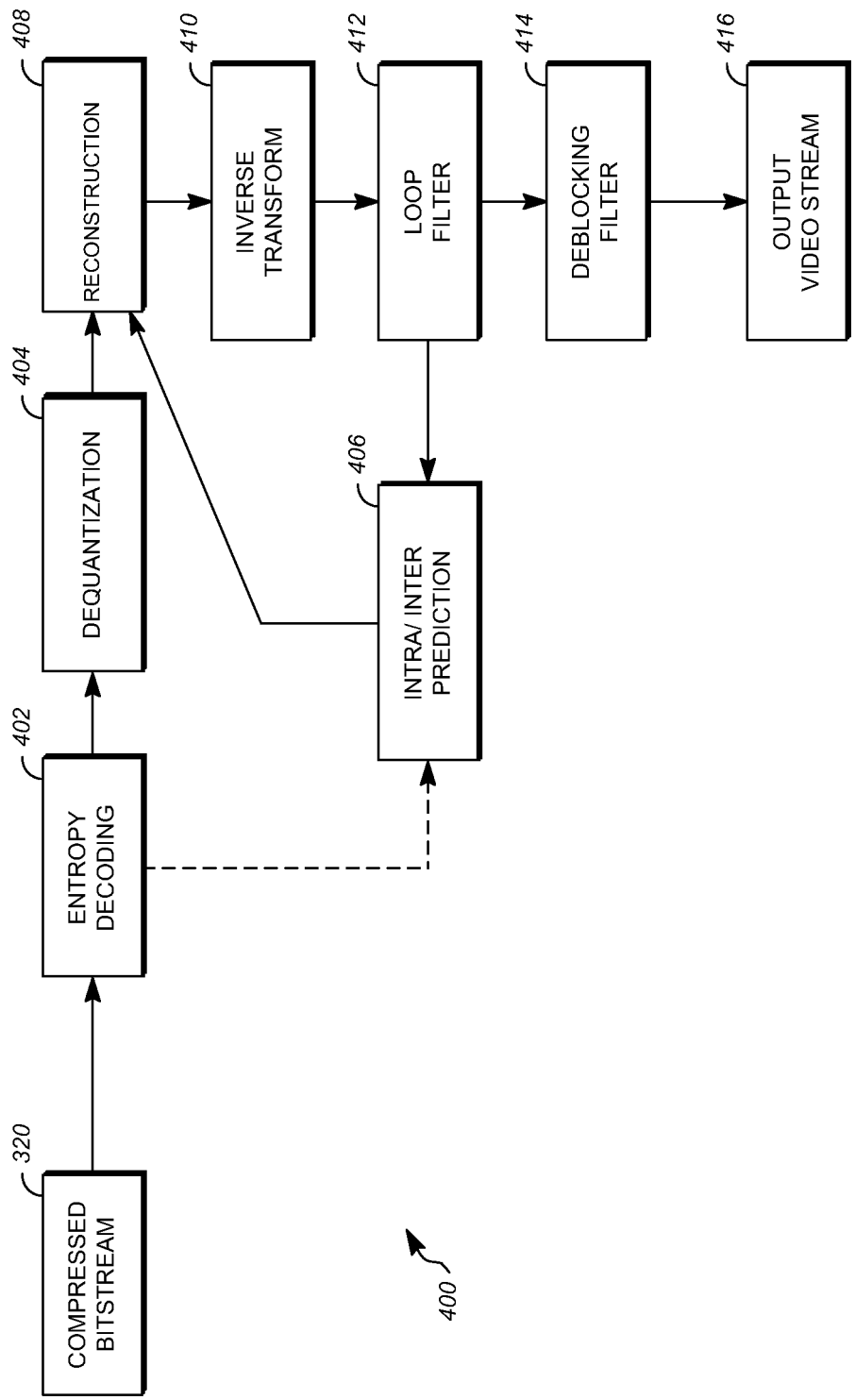
FIG. 4 is a block diagram of a video decompression system in accordance with implementations of this disclosure.

FIG. 4 is a block diagram of a decoder 400 in accordance with another implementation. Decoder 400 can be implemented, for example, in receiving station 110, such as by providing a computer software program stored in memory for example. The computer software program can include machine instructions that, when executed by CPU 112, cause receiving station 110 to decode video data in the manner described in FIG. 4. Decoder 400 can also be implemented as specialized hardware in, for example, transmitting station 102 or receiving station 110.

Decoder 400, similar to the reconstruction path of encoder 300 discussed above, includes in one example the following stages to perform various functions to produce an output video stream 416 from compressed bitstream 320: an entropy decoding stage 402, a dequantization stage 404, an intra/inter prediction stage 406, a reconstruction stage 408, an inverse transform stage 410, a loop filtering stage 412, and a deblocking filtering stage 414. Other structural variations of decoder 400 can be used to decode compressed bitstream 320.

When compressed bitstream 320 is presented for decoding, the data elements within compressed bitstream 320 can be decoded by the entropy decoding stage 402 (using, for example, Context Adaptive Binary Arithmetic Decoding) to produce a set of quantized transform coefficients. Dequantization stage 404 dequantizes the quantized transform coefficients (i.e., derivative residual). Using header information decoded from compressed bitstream 320, decoder 400 can use intra/inter prediction stage 406 to create the same prediction block as was created in encoder 300, e.g., at intra/inter prediction stage 306. At reconstruction stage 408, the prediction block can be added to the dequantized transform coefficients (i.e., derivative residual) to create reconstructed transform coefficients. At inverse transform stage 410, the reconstructed transform coefficients can be inverse transformed to produce a reconstructed block that can be identical to the block created by inverse transform stage 316 in encoder 300. Loop filtering stage 412 can be applied to the reconstructed block to reduce blocking artifacts. Deblocking filtering stage 414 can be applied to the reconstructed block to reduce blocking distortion. Output video stream 416 can also be referred to as a decoded video stream and the terms will be used interchangeably herein.

Other variations of decoder 400 can be used to decode compressed bitstream 320. For example, decoder 400 can produce output video stream 416 without deblocking filtering stage 414.

Figure 5:
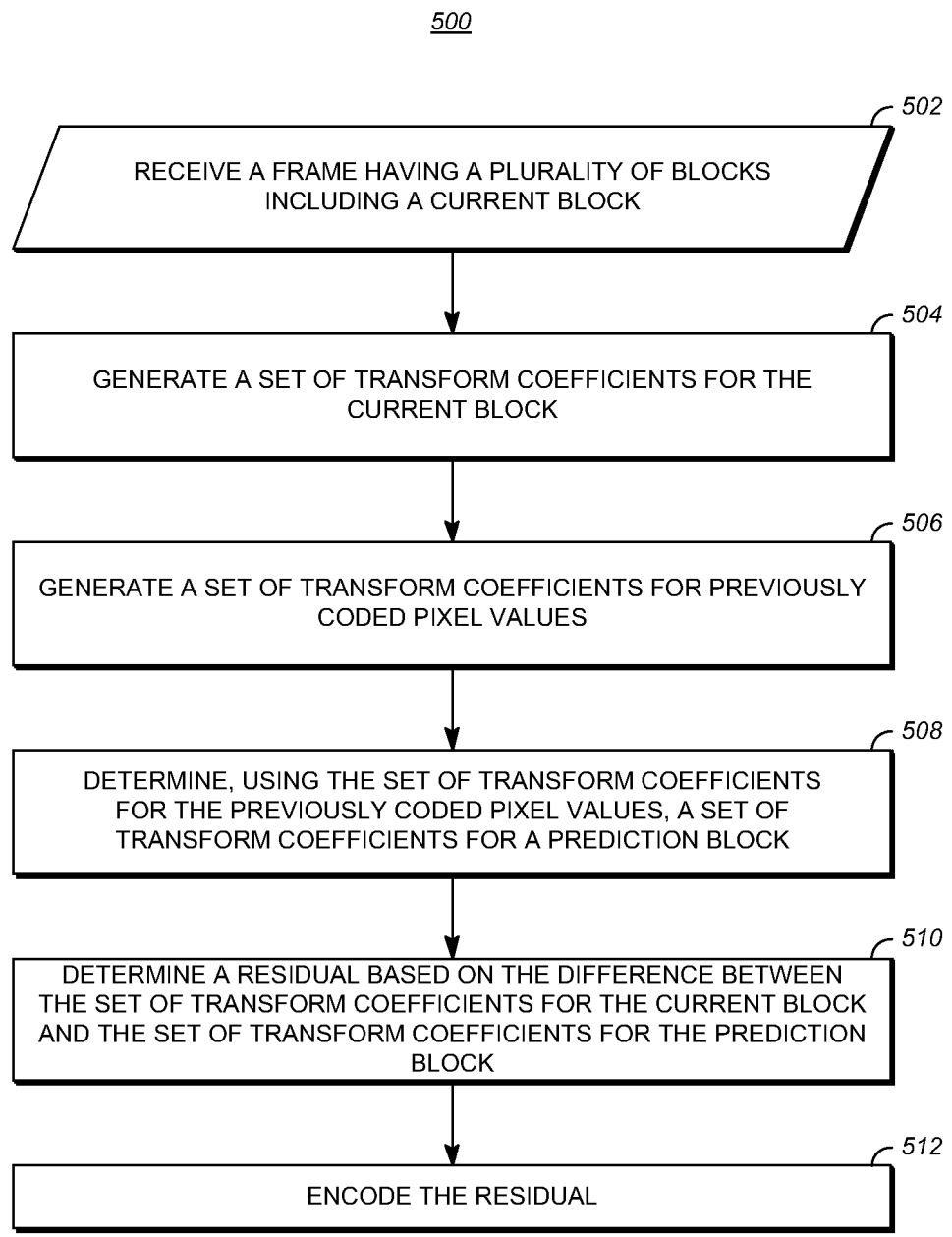
FIG. 5 is a flow diagram of an example method of operation for encoding a video stream using transform-domain intra prediction in accordance with implementations of this disclosure.

FIG. 5 is a flowchart showing an example method of operation 500 for encoding a video stream using transform-domain intra prediction in accordance with implementations of this disclosure. Method of operation 500 can be implemented in an encoder such as encoder 300 (shown in FIG. 3) and can be implemented, for example, as a software program that can be executed by computing devices such as transmitting station 102 or receiving station 110 (shown in FIG. 1). For example, the software program can include machine-readable instructions that can be stored in a memory such as memory 106 or memory 114, and that can be executed by a processor, such as CPU 104, to cause the computing device to perform method of operation 500.

Method of operation 500 can be implemented using specialized hardware or firmware. Some computing devices can have multiple memories, multiple processors, or both. The steps of method of operation 500 can be distributed using different processors, memories, or both. Use of the terms "processor" or "memory" in the singular encompasses computing devices that have one processor or one memory as well as devices that have multiple processors or multiple memories that can each be used in the performance of some or all of the recited steps.

Implementations of method of operation 500 can include, for example, receiving a frame of video data including a current block at a step 502, generating a set of transform coefficients for the current block at a step 504, generating a set of transform coefficients for previously coded pixel values at a step 506, determining a set of transform coefficients for a prediction block at a step 508, determining a residual based on a difference between the set of transform coefficients for the current block and the set of transform coefficients for the prediction block at a step 510, and encoding the residual at a step 512.

At step 502, a frame of video data having multiple blocks, including a current block, can be received by a computing device, such as transmitting station 102. Received, as used herein, includes acquired, obtained, read, or received in any manner whatsoever. The video data or stream can be received in any number of ways, such as by receiving the video data over a network, over a cable, or by reading the video data from a primary memory or other storage device, including a disk drive or removable media such as a CompactFlash (CF) card, Secure Digital (SD) card, or any other device capable of communicating video data. In some implementations, video data can be received from a video camera connected to the computing device.

At step 504, a set of transform coefficients can be generated for the current block using a two-dimensional transform. The set of transform coefficients can be arranged in, for example, a 4×4 block of transform coefficients. The two-dimensional transform can use any transform technique such as the examples described at transform stage 304 in FIG. 3. For example, the two-dimensional transform can be the DCT or WHT.

In some implementations, the two-dimensional transform can be applied in a row-column transform order, where the transform technique may be applied to at least one row of pixel values of the current block to determine an intermediate transform block, and to at least one column of the intermediate transform block to determine the set of transform coefficients.

In some implementations, the two-dimensional transform can be applied in a column-row transform order, where the transform technique may be applied to at least one column of pixel values of the current block to determine the intermediate transform block, and to at least one row of the intermediate transform block to determine the set of transform coefficients.

At step 506, a set of transform coefficients can be generated for previously coded pixel values using a one-dimensional transform. Data available for use during intra prediction can include previously coded pixel values. In some codec schemes, such as the schemes that use raster scanned coding, data available for use during intra prediction can include data in previously coded blocks in the frame. The previously coded blocks used for intra prediction can include, for example, blocks in rows above the current block and blocks to the left of the current block in the same row. For simplicity, the following examples are described using data in the row immediately above and the column immediately to the left of the current block. In other implementations, data from rows or columns not immediately adjacent to the current block, including data from blocks that are not adjacent to the current block, can be used to generate the set of transform coefficients for intra prediction.

The previously coded pixel values for use during intra prediction can be transformed into a set of transform coefficients (which may be referred to herein as "transform-domain predictors") using the one-dimensional transform. The one-dimensional transform can use any transform technique such as the examples described at transform stage 304 in FIG. 3. For example, the one-dimensional transform can be the DCT or WHT.

At step 508, a set of transform coefficients for a prediction block can be determined using the set of transform coefficients for the previously coded pixel values. The prediction block, which may be referred to as the "transform-domain prediction block", can be generated using a set of transform coefficients, such as the set of transform coefficients (i.e., transform-domain predictors) generated at step 506 for the row immediately above and immediately left of the current block.

Figure 6:
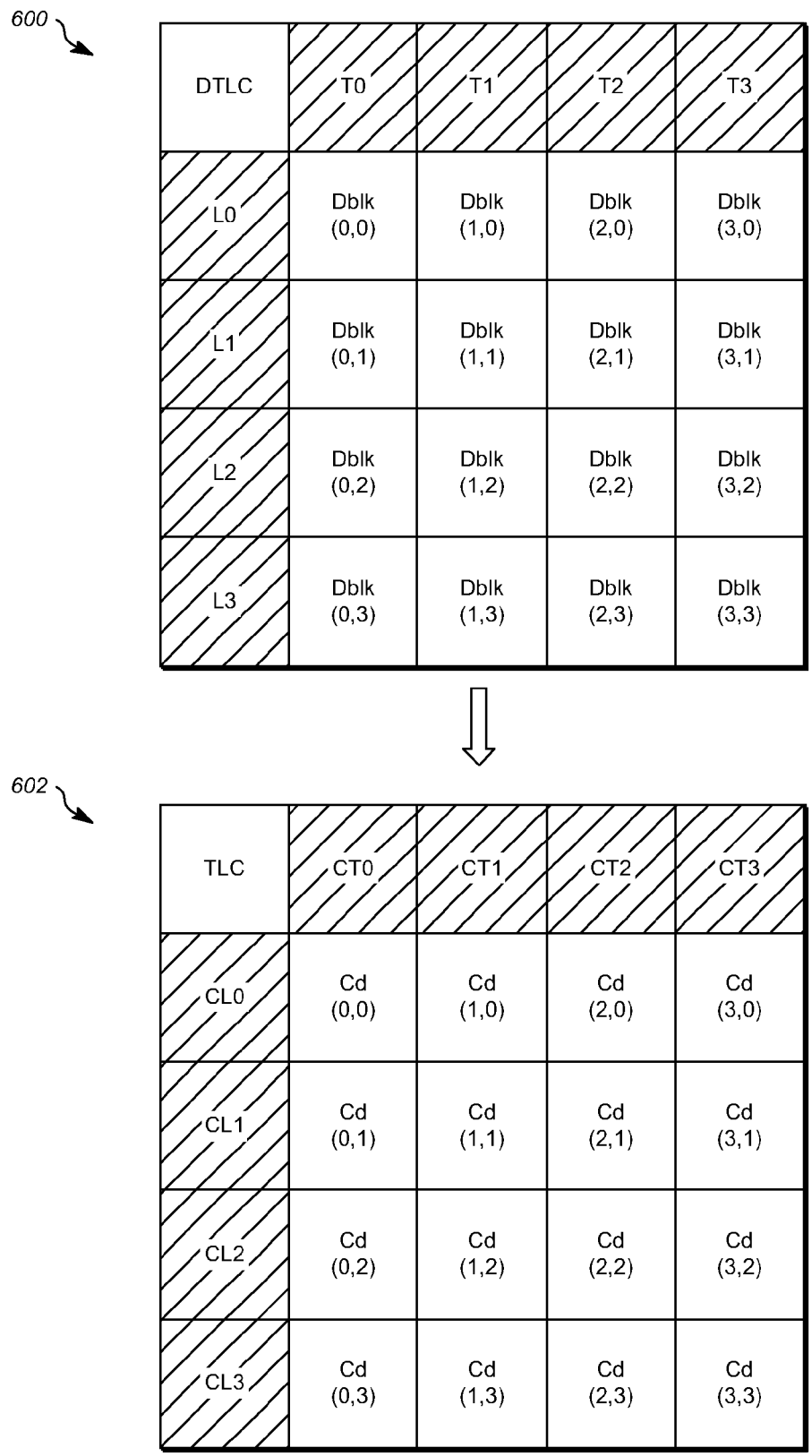
FIG. 6 is a diagram of an example block and an example transform coefficient block in accordance with implementations of this disclosure.

The set of transform coefficients for the transform-domain prediction block can be generated using the examples shown in FIGS. 6 and 7. Step 508 can be implemented, for example, at intra/inter prediction stage 306 of encoder 300 in FIG. 3.

At step 510, a residual (i.e., a transform-domain residual) can be determined based on the difference between the set of transform coefficients for the current block and the set of transform coefficients for the prediction block.

At step 512, the residual can be encoded. For example, the residual can be quantized at quantization stage 308, entropy coded at entropy encoding stage 310, and may be stored or transmitted in the encoded video stream 320.

Method of operation 500 is depicted and described as a series of steps. However, steps in accordance with this disclosure can occur in various orders or concurrently. For example, the transform-domain predictors in step 506 can be generated before or concurrently with the set of transform coefficients for the current block in step 504. Additionally, steps in accordance with this disclosure may occur with other steps not presented and described herein. In one example, a group of coefficients (e.g., DC coefficients) from the transform-domain residual can be further transformed using a transform technique, which can be the same as or different from the two-dimensional transform used in step 504. Furthermore, not all illustrated steps may be required to implement a method of transform-domain intra prediction. For example, the two-dimensional transform used in step 504 can be replaced by any other transform such as, for example, a one-dimensional transform.

FIG. 6 shows a diagram of an example current block 600 and an example transform coefficient block 602 in accordance with implementations of this disclosure. The current block 600, which may be in the (pre-transformation) spatial domain, can be transformed using the two-dimensional transform described in step 504 into the transform coefficient block 602, in the transform domain.

In this example, the current block 600 and the corresponding transform coefficient block 602 each have a set of 4×4 pixels, which can be represented by a 4×4 matrix. FIGS. 6-7 show blocks of 4×4 pixels for simplicity; however, any block size can be used.

In the spatial domain, the current block 600 can be represented by a 4×4 matrix Dblk as follows:

$$Dblk=[Dblk(i,j)], i=0,1,2,3; j=0,1,2,3; \quad (1)$$

where Dblk(i,j) is the pixel value for data element (i,j) in matrix Dblk.

A prediction block of the current block can be represented by a 4×4 matrix Pblk in the spatial domain as follows:

$$Pblk=[Pblk(i,j)], i=0,1,2,3; j=0,1,2,3; \quad (2)$$

where Pblk(i,j) is the predicted pixel value for data element (i,j). Pblk(0,0) may be a DC component of prediction block Pblk. Pblk(0,1)-Pblk(3,3) may be AC components of prediction block Pblk.

A residual block can be represented by a 4×4 residual error matrix Rblk in the spatial domain as follows:

$$Rblk=[Rblk(i,j)]=[Dblk(i,j)-Pblk(i,j)], i=0,1,2,3; j=0,1,2,3; \quad (3)$$

where Rblk(i,j) is the residual error value for data element (i,j) in matrix Rblk. In this example, the residual error value is the difference of pixel values between Dblk(i,j) of the current block and Pblk(i,j) of the prediction block.

Still in the spatial domain, an array DT of 4 pixels can be used to represent the data in a row immediately above the current block as follows:

$$DT=[Ti], i=0,1,\ldots 3. \quad (4)$$

An array DL of 4 pixels can be used to represent the data in a column immediately left of the current block as follows:

$$DL=[Lj], j=0,1,2,3. \quad (5)$$

In addition, DTLC can be used to represent the pixel above and to the left of the current block. DTLC and arrays DT and DL, which may be previously coded pixel values, can be used during intra prediction for predicting the current block. When transform-domain intra prediction is used, the previously coded pixel values DTLC, DT, and DL, which may be referred to as "spatial predictors", can be transformed using the one-dimensional transform described at step 506 into a set of transform-domain predictors CT, CL, TLC, an example of which will be discussed below in equation (9) below.

In the transform domain, Dblk can be transformed into a transform coefficient block Cd (e.g., block 602 in FIG. 6), which can be represented by a 4×4 matrix as follows:

$$Cd=[Cd(i,j)]=DCT2(Dblk), i=0,1,2,3; j=0,1,2,3; \quad (6)$$

where DCT2( ) is a two-dimensional DCT function.

In the transform domain, Pblk can be transformed into a 4×4 matrix Cp (i.e., transform-domain prediction block) as follows:

$$Cp=[Cp(i,j)]=DCT2(Pblk), i=0,1,2,3; j=0,1,2,3. \quad (7)$$

In the transform domain, Rblk can be transformed into a 4×4 matrix Cr as follows:

$$Cr=[Cr(i,j)]=[Cd(i,j)-Cp(i,j)], i=0,1,2,3; j=0,1,2,3. \quad (8)$$

As shown in FIG. 6, spatial predictors DT and DL can be transformed into transform coefficient arrays CT and CL as follows:

$$CT=DCT(DT)=[CT0,CT1,CT2,CT3];$$

$$CL=DCT(DL)=[CL0,CL1,CL2,CL3]; \quad (9)$$

where DCT( ) represents a one-dimensional 4-point DCT function; CT0 is a DC coefficient of array CT; CT1, CT2, CT3 are AC coefficients of array CT; CL0 is a DC coefficient of array CL; and CL1, CL2, CL3 are AC coefficients of array CL.

Transform-domain predictor TLC can take the value of DTLC (the pixel value above and to the left of the current block) or a different value, such as a multiple of a scalar value. The transform-domain predictors CT, CL and TLC can be used for intra prediction of the transform coefficient block 602 represented by matrix Cd, as shown in FIG. 7.

An array RAC can be used to represent scaled AC coefficients for transform coefficient array CT as follows:

$$RAC=[0,RAC1,RAC2,RAC3]=Kr*[0,CT1,CT2,CT3]; \quad (10)$$

where Kr is a scalar value. For example, Kr can be set as −1, 0, 1, or 2.

An array CAC can be used to represent scaled AC coefficients for transform coefficient array CL as follows:

$$CAC=[0,CAC1,CAC2,CAC3]=Kc*[0,CL1,CL2,CL3]; \quad (11)$$

where Kc is a scalar value. For example, Kc can be set as −1, 0, 1, or 2. In some implementations, Kr and Kc can be determined as the values that minimize prediction errors.

FIG. 7 shows a diagram of an example transform-domain prediction block 700 using transform-domain intra prediction in accordance with implementations of this disclosure. Transform-domain prediction block 700 may be generated from the transform-domain predictors, such as CT, CL, and TLC.

As shown in FIG. 7, transform-domain prediction block 700 can be represented by matrix Cp using transform-domain predictors CT, CL, Kr and Kc as follows:

$$Cp=[DC,Kr*CT1,Kr*CT2,Kr*CT3;Kc*CL1,0,0,0,0; Kc*CL2,0,0,0;Kc*CL3,0,0,0]. \quad (12)$$

DC in equation (12) may indicate a DC coefficient of transform-domain prediction matrix Cp, such as Cp(0,0), which can be predicted using a combination of adjacent transform-domain predictors, such as TLC, CT0, and CL0. In one implementation, DC can be predicted by the following equation:

$$DC=CT0+CL0. \quad (13)$$

In other implementations, a weighted combination of the transform-domain predictors can be used for generating the DC value.

In some implementations, transform-domain intra prediction modes can correspond to spatial-domain intra prediction modes. Spatial-domain intra prediction modes can include, for example, DC prediction mode, horizontal prediction mode, vertical prediction mode, and TrueMotion prediction mode. In one implementation of DC prediction mode, a single value using the average of the pixels in a row above a current block and a column to the left of the current block can be used to predict the current block. In one implementation of horizontal prediction, each column of a current block can be filled with a copy of a column to the left of the current block. In one implementation of vertical prediction, each row of a current block can be filled with a copy of a row above the current block. In one implementation of TrueMotion prediction, in addition to the row above the current block and the column to the left of the current block, the pixel P above and to the left of the block may be used. Horizontal differences between pixels in the row above the current block (starting from P) can be propagated using the pixels from the column to the left of the current block to start each row. Other spatial-domain intra prediction modes can include, for example, a diagonal-down-left prediction mode, a diagonal-down-right prediction mode, a vertical-right prediction mode, a horizontal-down prediction mode, a vertical-left prediction mode, or a horizontal-up prediction mode.

When implementing transform-domain intra prediction, a transform-domain intra prediction mode can be implemented to correspond to a spatial-domain intra prediction mode, such as horizontal prediction mode, vertical prediction mode, TrueMotion prediction mode, or any other spatial-domain intra prediction mode.

For example, if Kr and Kc are both set as zero, as shown in (12), transform-domain prediction block Cp may provide an equivalent prediction result of a DC prediction mode.

In another example, the transform-domain prediction block Cp may be equivalent to a prediction block generated using the vertical prediction mode, and may be expressed in the following equations:

$Kr=2;$ $Kc=0;$ $DC=2*CT0;$ $Cp=2*[CT0,CT1,CT2,CT3;0,0,0,0;0,0,0,0;0,0,0,0].$  (14)

In another example, the transform-domain prediction block Cp may be equivalent to a prediction block generated using the horizontal prediction mode, and may be expressed in the following equations:

$Kr=0;$ $Kc=2;$ $DC=2*CL0;$ $Cp=2*[CL0,0,0,0;CL1,0,0,0;CL2,0,0,0;CL3,0,0,0].$ (15)

In another example, the transform-domain prediction block Cp may be equivalent to a prediction block generated using the TrueMotion prediction mode, and may be expressed in the following equations:

$Kr=2;$ $Kc=2;$ $DC=(CT0+CL0-2*TLC);$ $Cp=2*[(CT0+CL0-2*TLC),CT1,CT2,CT3;CL1,0,0,0;\ CL2,0,0,0;CL3,0,0,0].$ (16)

In some implementations, a transform-domain prediction mode can be a prediction mode that is not an equivalent of any spatial-domain prediction mode. Six more examples of transform-domain prediction modes, each represented by a different transform-domain prediction block Cp, are shown below from (17) to (22):

$Kr=2;$ $Kc=1;$ $DC=2*CT0;$ $Cp=[2*CT0,2*CT1,2*CT2,2*CT3;CL1,0,0,0;CL2,0,\ 0,0;CL3,0,0,0].$ (17)

$Kr=1;$ $Kc=2;$ $DC=2*CL0;$ $Cp=[2*CL0,CT1,CT2,CT3;2*CL1,0,0,0;2*CL2,0,0,0;\ 2*CL3,0,0,0].$ (18)

$Kr=1;$ $Kc=1;$ $DC=CT0+CL0;$ $Cp=[CT0+CL0,CT1,CT2,CT3;CL1,0,0,0;CL2,0,0,0;\ CL3,0,0,0]$ (19)

$Kr=-1;$ $Kc=1;$ $DC=CT0+CL0;$ $Cp=[CT0+CL0,-CT1,-CT2,-CT3;CL1,0,0,0;CL2,0,\ 0,0;CL3,0,0,0].$ (20)

$Kr=1;$ $Kc=-1;$ $DC=CT0+CL0;$ $Cp=[CT0+CL0,CT1,CT2,CT3;-CL1,0,0,0;-CL2,0,0,\ 0;-CL3,0,0,0].$ (21)

$Kr=-1;$ $Kc=-1;$ $DC=CT0+CL0;$ $Cp=[CT0+CL0,-CT1,-CT2,-CT3;-CL1,0,0,0;-CL2,\ 0,0,0;-CL3,0,0,0]$ (22)

Using arrays RAC and CAC in (10) and (11), the transform-domain prediction matrix Cp can also be represented as follows:

$Cp=[DC,RAC1,RAC2,RAC3;CAC1,0,0,0,0;CAC2,0,0,\ 0;CAC3,0,0,0].$ (23)

In some implementations, a data item in matrix Cp, such as RAC1, RAC2, CAC1, can be adjusted by an independent scalar factor to provide better predictions under different scenarios. During implementation, the overhead incurred by using multiple transform-domain prediction modes can be balanced with quality of prediction results to achieve a desirable outcome.

Figure 8:
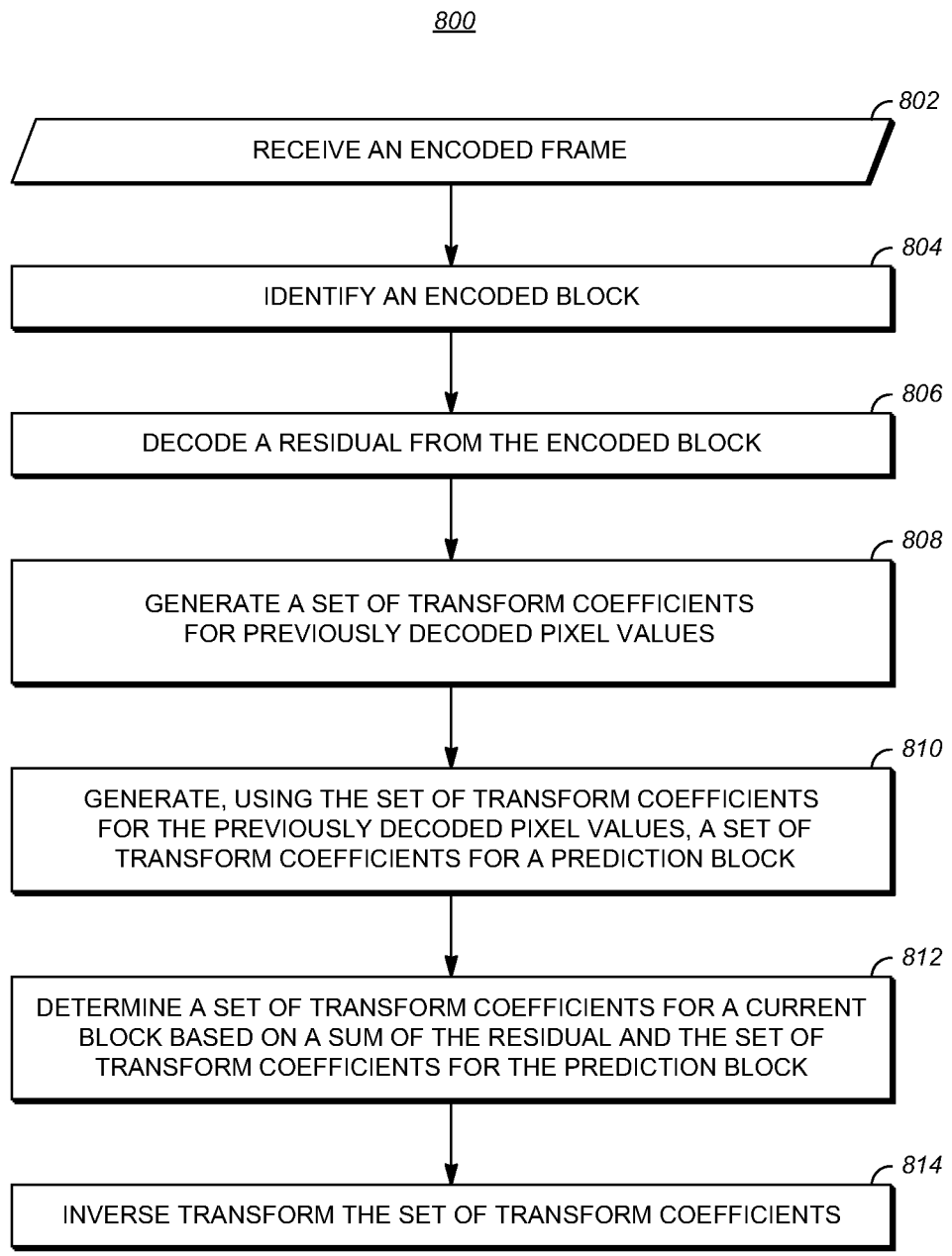
FIG. 8 is a flow diagram of an example method of operation for decoding a video stream using transform-domain intra prediction in accordance with implementations of this disclosure.

FIG. 8 is a flowchart of an example method of operation 800 for decoding an encoded video stream using transform-domain intra prediction in accordance with implementations of this disclosure. Method of operation 800 can be implemented, for example, as a software program that may be executed by computing devices such as transmitting station 102 or receiving station 110. For example, the software program can include machine-readable instructions that may be stored in a memory such as memory 106 or 114, and that, when executed by a processor, such as CPU 104 or 112, may cause the computing device to perform method of operation 800. Method of operation 800 can be implemented using specialized hardware or firmware. As explained above, some computing devices may have multiple memories or processors, and the steps of method of operation 800 can be distributed using multiple processors, memories, or both.

Implementations of decoding the encoded video stream can include, for example, receiving encoded video stream at a step 802, identifying an encoded block from an encoded frame at a step 804, decoding a residual from the encoded block at a step 806, generating a set of transform coefficients for previously decoded pixel values at a step 808, generating, using the set of transform coefficients for the previously decoded pixel values, a set of transform coefficients for a prediction block at a step 810, determining a set of transform coefficients for a derived current block based on sum of the residual and the set of transform coefficients for the prediction block at a step 812, and inverse transforming the set of transform coefficients to generate a derived current block at a step 814.

At step 802, a computing device such as receiving station 110 may receive encoded video stream, such as compressed bitstream 320. The encoded video stream (which may be referred to herein as the encoded video data) can be received in any number of ways, such as by receiving the video data over a network, over a cable, or by reading the video data from a primary memory or other storage device, including a disk drive or removable media such as a DVD, CompactFlash (CF) card, Secure Digital (SD) card, or any other device capable of communicating a video stream.

At step 804, an encoded block may be identified from an encoded frame in the encode video stream. The encoded frame can be identified in the encoded video data. The terms "identifies", "identify", or "identified" as used herein include to select, construct, determine, or specify in any manner whatsoever.

The encoded block can be, for example, a block that has been encoded at encoder 300 using any of the prediction techniques described herein, such as a prediction mode in the spatial domain or the transform domain. In one example, the block can be encoded using vertical predicting mode. In another example, the block can be encoded using any of the transform-domain prediction modes shown in FIGS. 6-7.

At step 806, a residual can be decoded from the encoded block. The residual can be decoded using decoding stages such as entropy decoding stage 402 and dequantization stage 404 shown in FIG. 4. The decoded residual can be derived from the transform-domain residual determined at step 510 at encoder 300.

At step 808, a set of transform coefficients (i.e., transform-domain predictors) can be generated for previously decoded pixel values. The previously decoded pixel values can include data in previously decoded blocks in the frame, which can include, for example, blocks in rows above the current block and blocks to the left of the current block in the same row. In some implementations, data in the row immediately above and the column immediately left of the current block, such as DT and DL shown in FIG. 6, may be transformed to generate the transform-domain predictors. In other implementations, data from rows or columns not immediately adjacent to the current block can be used to generate the transform-domain predictors.

The transform-domain predictors can be generated using, for example, a one dimensional transform, which can use any transform technique such as, for example, DCT or WHT. The one dimensional transform used at step 808 can be similar to the one dimensional transform described at step 506.

At step 810, a set of transform coefficients can be generated for a prediction block using the set of transform coefficients for the previously decoded pixel values. The transform coefficients for the prediction block can be determined from the transform-domain predictors using any transform-domain prediction technique, such as the transform-domain prediction modes shown in FIGS. 6-7 or equations (6)-(23).

At step 812, a set of transform coefficients can be determined for a derived current block based on a sum of the decoded residual, such as the decoded residual from step 806, and the set of transform coefficients for the prediction block, such as the decoded residual from step 810.

At step 814, the set of transform coefficients for the derived current block may be inversely transformed. The set of transform coefficients can be generated using, for example, a two dimensional inverse transform, which can include any transform technique, such as inverse DCT or inverse WHT. The two-dimensional inverse transform can be applied in the row-column order, the column-row order, or a combination thereof.

A frame can be reconstructed from the blocks derived from the inverse transformed coefficients, or the predicted values by intra or inter prediction, or both. For example, the frame can be reconstructed from the current block derived at step 814 using decoding stages such as loop filtering stage 412 and deblocking filtering stage 414 shown in FIG. 4. The output can be an output video stream, such as the output video stream 416 shown in FIG. 4, and may be referred to as a decoded video stream.

Method of operation 800 is depicted and described as a series of steps. However, steps in accordance with this disclosure can occur in various orders or concurrently. Additionally, steps in accordance with this disclosure may occur with other steps not presented and described herein. Furthermore, not all illustrated steps may be required to implement a method in accordance with the disclosed subject matter.

The implementations of encoding and decoding described above illustrate some exemplary encoding and decoding techniques. However, "encoding" and "decoding", as those terms are used herein, could mean compression, decompression, transformation, or any other processing or change of data.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such.

A computing device implementing the techniques disclosed herein (and the algorithms, methods, instructions, etc. stored thereon and/or executed thereby) can be realized in hardware, software, or any combination thereof including, for example, IP cores, ASICS, programmable logic arrays, optical processors, programmable logic controllers, microcode, microcontrollers, servers, microprocessors, digital signal processors or any other suitable circuit or other information processing device, now existing or hereafter developed. In the claims, the term "processor" should be understood as encompassing any of the foregoing hardware, either singly or in combination. The terms "signal" and "data" are used interchangeably.

Further, in some implementations, for example, the techniques described herein can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

In some implementations, transmitting station 102 and receiving station 110 can, for example, be implemented on computers in a screencasting system. Alternatively, transmitting station 102 can be implemented on a server and receiving station 110 or 40 can be implemented on a device separate from the server, such as a hand-held communications device (i.e. a cell phone). In this instance, transmitting station 102 can encode content using an encoder 300 into an encoded video signal and transmit the encoded video signal to the communications device. In turn, the communications device can then decode the encoded video signal using a decoder 400. Alternatively, the communications device can decode content stored locally on the communications device, i.e. content that was not transmitted by transmitting station 102. Other suitable transmitting station 102 and receiving station 110 implementation schemes are available. For example, receiving station 110 can be a generally stationary personal computer rather than a portable communications device and/ or a device including an encoder 300 may also include a decoder 400.

Further, all or a portion of implementations of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

Other embodiments or implementations may be within the scope of the following claims.

What is claimed is:

1. A method for encoding a frame in a video stream using a computing device, the frame having a plurality of blocks including a current block, the method comprising:
   generating, using a two-dimensional transform, a set of transform coefficients for the current block;
   generating, using a one-dimensional transform, a set of transform coefficients for a plurality of previously coded pixel values in the frame, wherein the set of transform coefficients for the plurality of previously coded pixel values includes transform coefficients for a row above and immediately adjacent to the current block and transform coefficients for a column to the left and immediately adjacent to the current block;
   determining, using the set of transform coefficients for the previously coded pixel values, a set of transform coefficients for a transform-domain prediction block;
   determining a transform-domain residual based on a difference between the set of transform coefficients for the current block and the set of transform coefficients for the transform-domain prediction block, wherein DC indicates a DC coefficient for the set of transform coefficients for the prediction block; Kr indicates a first scalar value; Kc indicates a second scalar value; CT0 indicates a DC coefficient for the row above and immediately adjacent to the current block; CT1 indicates an AC coefficient for the row above and immediately adjacent to the current block; CT2 indicates an AC coefficient for the row above and immediately adjacent to the current block; CT3 indicates an AC coefficient for the row above and immediately adjacent to the current block; CL0 indicates a DC coefficient for the column left and immediately adjacent to the current block; CL1 indicates an AC coefficient for the column left and immediately adjacent to the current block; CL2 indicates an AC coefficient for the column left and immediately adjacent to the current block; CL3 indicates an AC coefficient for the column left and immediately adjacent to the current block; * indicates multiplication; and wherein determining the set of transform coefficients for the prediction block includes using the following matrix: [DC, Kr*CT1, Kr*CT2, Kr*CT3; Kc*CL1, 0, 0, 0; Kc*CL2, 0, 0, 0; Kc*CL3, 0, 0, 0];
   encoding a bitstream that includes the transform-domain residual; and
   performing, by the computing device, at least one of storing the encoded bitstream or transmitting the encoded bitstream.

2. The method of claim 1, wherein Kr is equal to one of −1, 0, 1 and 2 and wherein Kc is equal to one of −1, 0, 1 and 2.

3. The method of claim 2, wherein DC is equal to one of 2*CT0, 2*CL0, or CT0*CL0.

4. The method of claim 1, wherein the one-dimensional transform is a 4-point discrete cosine transform and wherein the two-dimensional transform is a 4×4 discrete cosine transform.

5. The method of claim 1, wherein the set of transform coefficients for the transform-domain prediction block represent a prediction mode that is not equivalent to any spatial-domain prediction mode.

6. A method for decoding a frame in an encoded video stream using a computing device, the frame having a plurality of blocks including a current block, the method comprising:
   decoding a transform-domain residual for the current block from the encoded video stream;
   generating, using a one-dimensional transform, a set of transform coefficients for a plurality of previously decoded pixel values in the frame, wherein the set of transform coefficients for the plurality of previously coded pixel values includes transform coefficients for a row above and immediately adjacent to the current block and transform coefficients for a column to the left and immediately adjacent to the current block;
   generating, using the set of transform coefficients for the previously decoded pixel values, a set of transform coefficients for a transform-domain prediction block;
   determining a set of transform coefficients for the current block based on a sum of the transform-domain residual and the set of transform coefficients for the transform-domain prediction block, wherein DC indicates a DC coefficient for the set of transform coefficients for the prediction block; Kr indicates a first scalar value; Kc indicates a second scalar value; CT0 indicates a DC coefficient for the row above and immediately adjacent to the current block; CT1 indicates an AC coefficient for the row above and immediately adjacent to the current block; CT2 indicates an AC coefficient for the row above and immediately adjacent to the current block; CT3 indicates an AC coefficient for the row above and immediately adjacent to the current block; CL0 indicates a DC coefficient for the column left and immediately adjacent to the current block; CL1 indicates an AC coefficient for the column left and immediately adjacent to the current block; CL2 indicates an AC coefficient for the column left and immediately adjacent to the current block; CL3 indicates an AC coefficient for the column left and immediately adjacent to the current block; * indicates multiplication; and wherein determining the set of transform coefficients for the prediction block includes using the following matrix: [DC, Kr*CT1, Kr*CT2, Kr*CT3; Kc*CL1, 0, 0, 0; Kc*CL2, 0, 0, 0; Kc*CL3, 0, 0, 0];

inverse transforming the set of transform coefficients for the current block using a second transform, wherein the second transform is a two-dimensional transform;

generating a decoded video using the inverse-transformed transform coefficients; and performing, by the computing device, at least one of storing the decoded video or displaying the decoded video.

7. The method of claim 6 wherein Kr is equal to one of −1, 0, 1 and 2 and wherein Kc is equal to one of −1, 0, 1 and 2.

8. The method of claim 7, wherein DC is equal to one of 2*CTO, 2*CL0, or CT0*CL0.

9. The method of claim 6, wherein the one-dimensional transform is a 4-point discrete cosine transform and wherein the two-dimensional transform is a 4×4 discrete cosine transform.

10. The method of claim 6, wherein the set of transform coefficients for the transform-domain prediction block represent a prediction mode that is not equivalent to any spatial-domain prediction mode.

11. An apparatus for encoding a video stream having at least one frame having a plurality of blocks including a current block, comprising:

a memory; and a processor configured to execute instructions stored in the memory to:

generate, using a two-dimensional transform, a set of transform coefficients for the current block;

generate, using a one-dimensional transform, a set of transform coefficients for a plurality of previously coded pixel values in the frame, wherein the set of transform coefficients for the plurality of previously coded pixel values includes transform coefficients for a row above and immediately adjacent to the current block and transform coefficients for a column to the left and immediately adjacent to the current block;

determine, using the set of transform coefficients for the previously coded pixel values, a set of transform coefficients for a transform-domain prediction block;

determine a transform-domain residual based on a difference between the set of transform coefficients for the current block and the set of coefficients for the transform-domain prediction block, wherein DC indicates a DC coefficient for the set of transform coefficients for the prediction block; Kr indicates a first scalar value; Kc indicates a second scalar value; CT0 indicates a DC coefficient for the row above and immediately adjacent to the current block; CT1 indicates an AC coefficient for the row above and immediately adjacent to the current block; CT2 indicates an AC coefficient for the row above and immediately adjacent to the current block; CT3 indicates an AC coefficient for the row above and immediately adjacent to the current block; CL0 indicates a DC coefficient for the column left and immediately adjacent to the current block; CL1 indicates an AC coefficient for the column left and immediately adjacent to the current block; CL2 indicates an AC coefficient for the column left and immediately adjacent to the current block; CL3 indicates an AC coefficient for the column left and immediately adjacent to the current block; * indicates multiplication; and wherein determining the set of transform coefficients for the prediction block includes using the following matrix: [DC, Kr*CT1, Kr*CT2, Kr*CT3; Kc*CL1, 0, 0, 0; Kc*CL2, 0, 0, 0; Kc*CL3, 0, 0, 0];

encode a bitstream that includes the transform-domain residual; and perform at least one of storing the encoded bitstream or transmitting the encoded bitstream.

12. The apparatus of claim 11, wherein the set of transform coefficients for the transform-domain prediction block represent a prediction mode that is not equivalent to any spatial-domain prediction mode.

* * * * *